Figure 1:
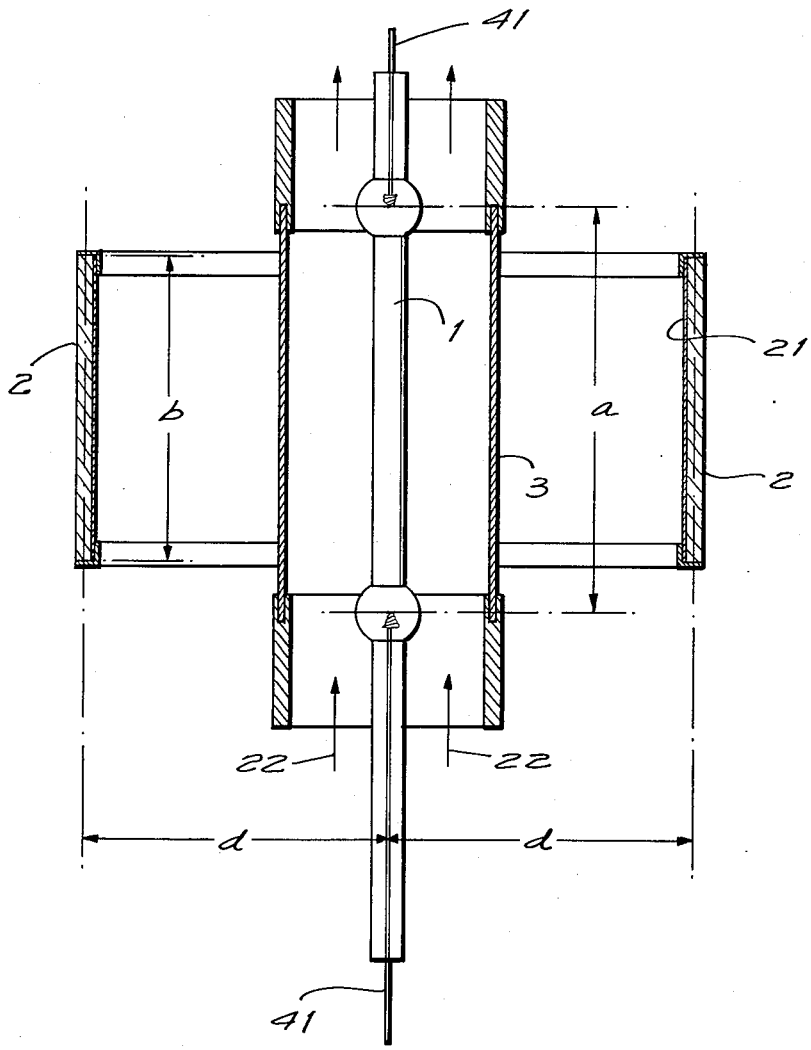

INVENTORS.
HERMANN GÜNTHER AND
JOSEF KERN

2,987,914
APPARATUS FOR COLOR-FAST TESTING
Hermann Günther, Schwedenstrasse 13, and Josef Kern, Hohensonnenstrasse, both of Hanau, Germany
Filed Nov. 8, 1954, Ser. No. 467,586
Claims priority, application Germany Nov. 7, 1953
4 Claims. (Cl. 73—150)

The present invention relates to a new and improved apparatus for testing the color-fastness of a specimen of material. More particularly the present invention provides a new and improved apparatus which is adaptable for use with many different types of materials such as textile fabrics, paint and the like.

Conventional methods and apparatus for testing specimens of materials for color-fastness subject the specimen to illumination coming from an artificial source. The specimen is arranged on the inner surface of a cylindrical mounting member and the source of illumination is mounted coaxially with the axis of the cylindrical mounting member. However, in conventional apparatus the length of the source of illumination is usually substantially shorter than the axial length of the specimen so that the intensity of the illumination reaching the specimen varies from one part of the specimen to the other.

Also, conventional methods and apparatus do not give accurate results because the source of illumination used contains a different emission spectrum than does the natural rays of the sun. Similarly, the close spacing between the artificial source of illumination and the specimen has undesirable side effects which do not occur once the material is placed in commercial use.

On the other hand, apparatus incorporating the principles of the present invention subjects the specimen to be tested to a homogeneous illumination so that every part of the specimen receives the same amount of exposure. Also apparatus incorporating the principles of the present invention include means for eliminating any differences existing between the artificial source of illumination and the natural rays of the sun.

Accordingly, it is an object of the present invention to provide a new and improved apparatus which accurately determines the color-fastness of a specimen.

Another object of the present invention is to provide a new and improved apparatus which accurately reproduces the actual conditions to which the material is subjected after it is placed in commercial use.

A further object of the present invention is to provide an apparatus for testing the color fastness of a specimen under varying conditions.

The present invention includes and apparatus for testing the color-fastness of a specimen having a cylindrical mounting member having an inner surface adapted to mount the specimen, and a source of illumination mounted coaxially with the axis of the cylindrical mounting member and symmetrically with respect to the specimen, the length of the source of illumination being at least 1.2 times the axial length of the specimen.

Figure 2:
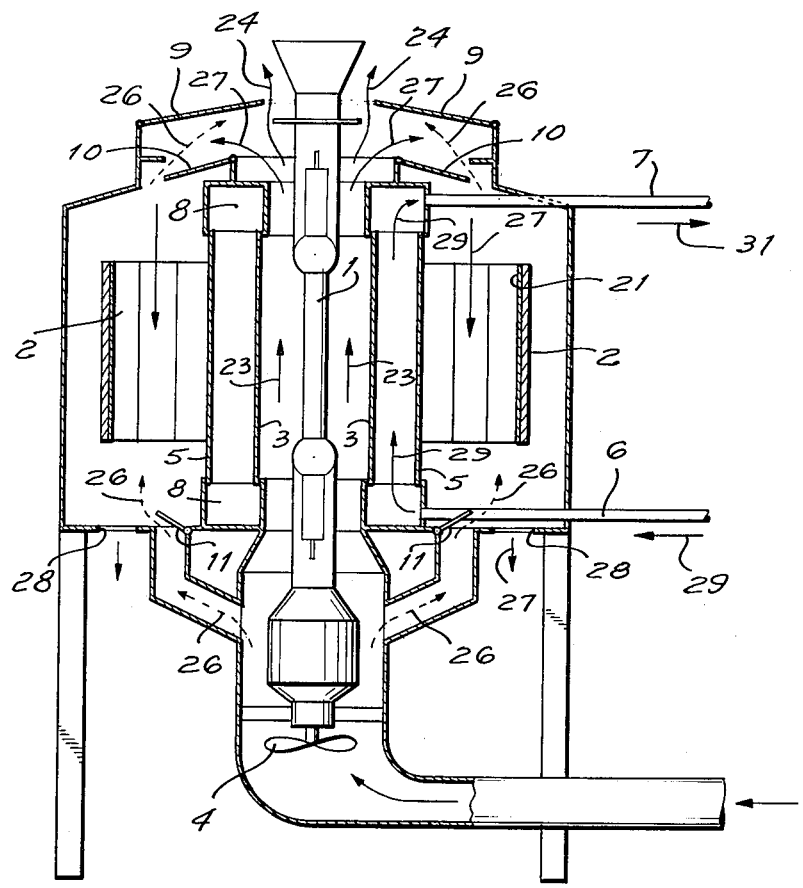

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a longitudinal cross-sectional view of a first embodiment of apparatus incorporating the principles of the present invention; and FIG. 2 is a longitudinal partly sectional view of a second embodiment of apparatus incorporating the principles of the present invention.

Referring now to FIG. 1 it is seen that the source of illumination 1 is coaxially disposed along the axis of a cylindrical mounting member 2. Attached to the opposite ends of the source 1 are conductors 41 adapted to be connected to a power source. The cylindrical mounting member 2 has an inner surface adapted to mount a specimen 21 to be tested. Arranged in the space between the source 1 and the specimen 21 is a filter 3 which divides the volume between the source and the specimen into two separate volumes.

In operation the source of illumination 1 is energized by means not illustrated and the specimen 21 receives a homogeneous illumination so that every part of the specimen is subjected to exactly the same amount of illumination. In accordance with the principles of the present invention the length $a$ of the light emissive portion of the source 1 is at least 1.2 times the axial length $b$. Since the source is symmetrically arranged with respect to the specimen the result is the homogeneous illumination described above.

It is apparent therefore that the apparatus illustrated in FIG. 1 will operate satisfactorily and provide better results than available in the prior art even without the insertion of the filter 3. However, if the proper filter is used it is possible to filter out the very short wave lengths from the light spectrum emitted by the source of illumination. For example, filters are available for absorbing a range below 290 m$\mu$. These very short wave lengths are not present in the natural illumination emitted from the sun and accordingly apparatus using the principles of the present invention as illustrated in FIG. 1 will subject the specimen to the homogeneous radiation substantially of the type it receives after it is placed in commercial use.

In accordance with the principles of the present invention cooling air may be introduced in the direction of the arrows 22 into the first volume between the source and the filter 3. This will remove any excess heat introduced by the source after it has been on for a substantial period of time. If desired, of course, it is possible to introduce the cooling air into the second volume between the filter and the specimen.

Another feature of the present invention is that the length $a$ of the light emissive portion of the source 1 is at least as large as the distance $d$ between the source and the specimen 21. This feature will also provide more accurate results than available in prior art apparatus since the amount of illumination reaching the specimen is controlled.

Referring now to FIG. 2 a second embodiment of apparatus incorporating the present invention will be described. In this embodiment it is seen that the length of the light emissive portion of the source 1 is at least 1.2 times the axial length of the specimen 21. Also, this length of the light emissive portion is at least equal to the distance between the source and the specimen. In addition to the above, the illustrated embodiment has several other features. Mounted below a source 1 is a blower 4 adapted to introduce cooling air into the volume between the source and the filter 3 and the filter and the specimen 21. On the intake side of the cooling air are throttle valves 11 which permit the cooling air to be introduced directly into the second volume between the filter 3 and the specimen 21. The cooling air introduced into the first volume between the source 1 and the filter 3 passes directly into this volume without any intermediary valves.

Mounted above the cylindrical member 2 are valves 9 and 10. The valves 9 control the discharge of the cooling air into the atmosphere and the valves 10 control the flow between the first and second volumes of the apparatus.

Surrounding the filter 3 is a second tubular member 5 which is mounted in fluid-tight fashion to the filter 3 by means of capping members 8. An inlet conduit 6 leads into the interior of the lower member 8 and an outlet conduit leads out of the upper member 8.

In operation the apparatus is capable of carrying out the method of the present invention in accordance with the description above for the apparatus illustrated in FIG. 1. In addition, cooling air can be introduced into the first volume by the blower 4 as shown by the arrows 23. If it is desired only to cool the source, the valves 10 and 11 are closed and the valves 9 are opened. The cooling air will pass through the first volume adjacent the source 1 and the resultant warmed air will pass into the atmosphere through the valves 9 as shown by the arrows 24.

If it is desired to cool both the source and the specimen, the valves 10 and 11 are opened the desired amount and the valves 9 are opened wide. The cooling air will flow in accordance with the arrows 23 and 24 through the first volume as before. In addition, the cooling air will flow through the second volume as shown by the dotted arrows 26 and out to the atmosphere through the valves 10 and 9, respectively.

If it is desired to warm the specimen 21, the valves 11 are closed and the valves 9 and 10 are open an amount depending on the temperature to which it is desired to raise the temperature of the specimen. The cooling air will now flow through the first volume as indicated by the arrows 23 where it is warmed. Some of the warmed air will be discharged into the atmosphere in accordance with the size of the opening of the valves 9. The remainder of the warmed air will flow through the valves 10 into the second volume as indicated by the arrows 27 and out through the exit ports 28.

A further method of cooling the volumes and absorbing heat radiation is supplied by the inlet and outlet means 6 and 7, respectively, and the fluid-tight space between the tubular member 5 and the filter 3. Cooling water may be introduced into the inlet conduit 6 shown by the arrow 29 to pass through the space between members 3 and 5 and out through the outlet conduit 7 as shown by the arrow 31. It is apparent that the filter may be between the tubular member 5 and the specimen or that members 3 and 5 could be ordinary transparent members with the filtering medium composed of a fluid circulated through the space therebetween.

In accordance with the invention it is possible to use a low pressure xenon lamp which is fabricated with an internal pressure of 1 atmosphere rather than the conventional internal pressure of 3 atmospheres. It is apparent that the possibility of explosion of such a lamp is materially decreased by using the lower pressure.

It will be understood that each of the elements described above, or two or more together, may also find a useful application in other types of testing methods differing from the types described above.

While the invention has been illustrated and described as embodied in an apparatus for testing the color-fastness of a specimen, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for testing the color-fastness of a specimen comprising, in combination, a cylindrical mounting member having an inner surface adapted to mount the specimen; an artificial source of illumination mounted coaxially with the axis of said cylindrical mounting member, said artificial source of illumination emitting rays having wavelengths substantially in the range of rays emitted by the sun; filtering means positioned between said source of illumination and the specimen to eliminate a range of the illumination spectrum emitted by said source if desired and to divide the space between the source of illumination and the specimen into two separate zones; and means for forcing fluid through said zones in series in a preselected manner.

2. Apparatus for testing the color-fastness of a specimen comprising, in combination, a cylindrical mounting member having an inner surface adapted to mount the specimen; a source of illumination mounted coaxially with the axis of said cylindrical mounting member; filtering means disposed between the specimen and said source, said filtering means dividing the volume between said source and the specimen into a first volume surrounding said source and a second volume between the filter and the specimen; means for introducing cooling air into said first volume for cooling said source of illumination whereby said air is warmed; and means for subsequently introducing the warm air into the second volume to warm the specimen whenever desired.

3. Apparatus for testing the color-fastness of a specimen comprising, in combination, a cylindrical mounting member having an inner surface adapted to mount the specimen; a source of illumination mounted coaxially with the axis of said cylindrical mounting member; filtering means disposed between the specimen and said source, said filtering means dividing the volume between said source and the specimen into a first volume surrounding said source and a second volume between the filter and the specimen; a blower for forcing cooling air into the first volume; first valve means for permitting said cooling air to flow into said second volume whenever desired; and second valve means for providing an exit for said cooling air after it has left said first and second volumes.

4. Apparatus for testing the color-fastness of a specimen comprising, in combination, a cylindrical mounting member having an inner surface adapted to mount the specimen; a source of illumination mounted coaxially with the axis of said cylindrical mounting member; filtering means disposed between the specimen and said source, said filtering means dividing the volume between said source and the specimen into a first volume surrounding said source and a second volume between the filter and the specimen; a blower for forcing cooling air into the first volume; first valve means for permitting said cooling air to flow into said second volume whenever desired; second valve means for providing an exit for said cooling air after it has left said first and second volumes; and third valve means for permitting air warmed in said first volume to flow into said second volume whenever desired.

References Cited in the file of this patent

UNITED STATES PATENTS

| | | |
|---|---|---|
| 1,558,786 | Buttolph | Oct. 27, 1925 |
| 1,818,687 | Buttolph | Aug. 11, 1931 |
| 1,969,606 | Hall | Aug. 7, 1934 |
| 2,547,367 | Booth | Apr. 3, 1951 |
| 2,640,354 | Bernegger | June 2, 1953 |

FOREIGN PATENTS

| | | |
|---|---|---|
| 204,587 | Great Britain | Oct. 4, 1923 |